United States Patent
Honda et al.

[11] Patent Number: 6,147,999
[45] Date of Patent: Nov. 14, 2000

[54] ATM SWITCH CAPABLE OF ROUTING IP PACKET

[75] Inventors: Masahiko Honda; Mikiharu Yamashita, both of Tokyo, Japan

[73] Assignee: NEC Corporation, Tokyo, Japan

[21] Appl. No.: 09/321,241

[22] Filed: May 27, 1999

[30]    Foreign Application Priority Data

May 29, 1998  [JP]  Japan ................... 10-150437

[51] Int. Cl.[7] .................................. H04L 12/28
[52] U.S. Cl. ............................ 370/396; 370/401
[58] Field of Search .................. 370/355, 395, 370/254, 466, 347, 396, 397, 401, 409, 473, 474; 395/200

[56]    References Cited

U.S. PATENT DOCUMENTS

| | | | |
|---|---|---|---|
| 5,383,181 | 1/1995 | Aramaki | 370/60 |
| 5,583,862 | 12/1996 | Callon | 370/397 |
| 5,623,605 | 4/1997 | Keshav et al. | 395/200.17 |
| 5,673,263 | 9/1997 | Basso et al. | 370/396 |
| 5,687,168 | 11/1997 | Iwata | 370/255 |
| 5,715,250 | 2/1998 | Watanabe | 370/395 |
| 5,724,358 | 3/1998 | Headrick et al. | 370/418 |
| 5,764,645 | 6/1998 | Bernet et al. | 370/466 |
| 5,903,559 | 5/1999 | Acharya et al. | 370/355 |
| 5,963,555 | 10/1999 | Takase et al. | 370/395 |
| 6,009,097 | 12/1999 | Han | 370/395 |

FOREIGN PATENT DOCUMENTS

| | | |
|---|---|---|
| 998189 | 4/1997 | Japan . |
| 10-28136 | 1/1998 | Japan . |

OTHER PUBLICATIONS

Japanese Office Action dated Jan. 20, 2000 with partial English translation.

Kazuho Miki, et al. *IP Data Transfer Over Public ATM Networks*, The Institute of Electronics, Information and Communication Engineers, vol. 97, No. 210, Jul. 25, 1997.

*Primary Examiner*—Chau Nguyen
*Assistant Examiner*—Chiho Andrew Lee
*Attorney, Agent, or Firm*—Ostrolenk, Faber, Gerb & Soffen, LLP

[57]    ABSTRACT

Disclosed is an ATM switch which comprises: an ATM switch unit; a switch control unit for controlling the ATM switch unit; one or more circuit accommodation units for connecting the switch with one or more external ATM networks, respectively, and an IP routing process unit for routing IP packets in a form of ATM cells. In the ATM switch, the IP routing process unit may comprise: a cell storage unit having a plurality of memories; a distributing means for distributing the ATM cells received from the ATM switch unit to the plurality of memories while grouping the ATM cells into each of the plurality of memories in accordance with an IP packet to which each of the ATM cells belongs; sending means for sending all the ATM cells belonging to an identical IP packet when the all the ATM cells belonging to the identical IP packet have been stored in respective one of the plurality of memories; and means for converting VPI/VCI (Virtual Path Identifier/ Virtual Channel Identifier) of the all the ATM cells belonging to the identical IP packet.

8 Claims, 5 Drawing Sheets

ATM SWITCH CAPABLE OF ROUTING IP PACKET

BACKGROUND OF THE INVENTION

1. Field of the Invention

The present invention relates to an ATM switch for use in an ATM network and more particularly, to an ATM switch having a function of routing an IP packet.

2. Description of the Related Art

ATM router is the general name given to IP (Internet Protocol) routers having one or more ports for accommodating ATM circuits. The port herein explained means an interface which can connect physical circuits such as Ethernet, FDDI and ATM.

In case of a router which has only an Ethernet interface defined by an internet standard, IEEE 802.3, an incoming packet from a certain interface is generally output to another interface in accordance with a routing table present within the router.

In the ATM circuits, there is a concept of a virtual circuit (hereinafter, referred to as "VC") which can accommodate a plurality of circuits bundled in one physical circuit. Insome ATM routes, the same port receives a packet and transmits the same packet which is subjected to a routing process. That is, it is required for the ATM router that the routing process is managed by the VC rather than according to each port.

In a case where the IP packets are accommodated in the ATM circuits, an encapsulation method defined in RFC 1483 is employed. That is, when focusing attention to one VC, one IP packet is segmented into successive ATM cells before being transmitted.

Therefore, in the ATM router, the original IP packet is reassembled from these ATM cells and then subjected to a routing process before being segmented into the successive ATM cells again to be transmitted. That is, both the processes of reassembling the IP packet from the ATM cells and of segmenting the IP packet into the ATM cells are required.

A first disadvantage of the Prior Art is that two kinds of facilities, ATM routers and ATM switches, are required for constructing an ATM network.

A second disadvantage of the Prior Art is that the packet transmission capability of the network can not be improved unless the performance of the ATM router is improved, because the performance of the ATM router is a bottleneck for the packet transmission capability of the ATM network.

SUMMARY OF THE INVENTION

An object of the present invention is to provide an ATM switch capable of routing an IP packet.

According to the present invention, there is provided an ATM switch which comprises: an ATM switch unit; a switch control unit for controlling the ATM switch unit; one or more circuit accommodation units for connecting the switch with one or more external ATM networks, respectively; and an IP routing process unit for routing IP packets in a form of ATM cells.

In the ATM switch, the IP routing process unit may comprise: a cell storage unit having a plurality of memories; a distributing means for distributing the ATM cells received from the ATM switch unit to the plurality of memories while grouping the ATM cells in each of the plurality of memories in accordance with an IP packet to which each of the ATM cells belongs; sending means for sending all the ATM cells belonging to an identical IP packet when all of the ATM cells belonging to the identical IP packet have been stored in a respective one of the plurality of memories; and means for converting a VPI/VCI (Virtual Path Identifier/Virtual Channel Identifier) of all of the ATM cells belonging to the identical IP packet.

In the ATM switch, each of the plurality of memories may comprise a FIFO.

In the ATM switch, the distributing means may comprise: a means for storing connection identifiers each corresponding to a VPI/VCI before conversion and storing identification numbers each corresponding to a respective non-vacant memory among the plurality of memories while holding correspondence between the connection identifiers and the identification numbers; and a queue for queueing identification numbers of vacant memories among the plurality of memories.

In the ATM switch, the sending means may detect whether or not the all the ATM cells in the identical IP packet have been stored in a respective one of the plurality of memories by use of an identifier for identifying the last ATM cell among all of the ATM cells in the identical IP packet.

In the ATM switch, the converted VPI/VCI corresponds to an IP address of the IP packet to which the ATM cell belongs.

In the ATM switch, the IP routing process unit may further comprise a routing table for holding a correspondence between the converted VPI/VCI and the IP address.

In the ATM switch, the IP routing process unit may further comprise a means for updating the contents of the routing table in response to the generation of a routing protocol.

In the ATM switch, the ATM switch may comprise a plurality of the IP routing process units.

Other features and advantages of the invention will become apparent from the following description of the preferred embodiments thereof.

BRIEF DESCRIPTION OF THE DRAWINGS

The present invention will be more fully understood from the following detailed explanation with reference to the accompanying drawings, in which.

DETAILED DESCRIPTION OF THE PREFERRED EMBODIMENTS

A First Embodiment

ATM switch 1 according the first embodiment of the present invention can perform a high speed routing process of an IP packet by routing the IP packet without reassembling the IP packet from ATM cells. ATM switch 1 also serves as an ATM router by only adding hardware of a relatively small scale to a conventional ATM switch.

Figure 1:
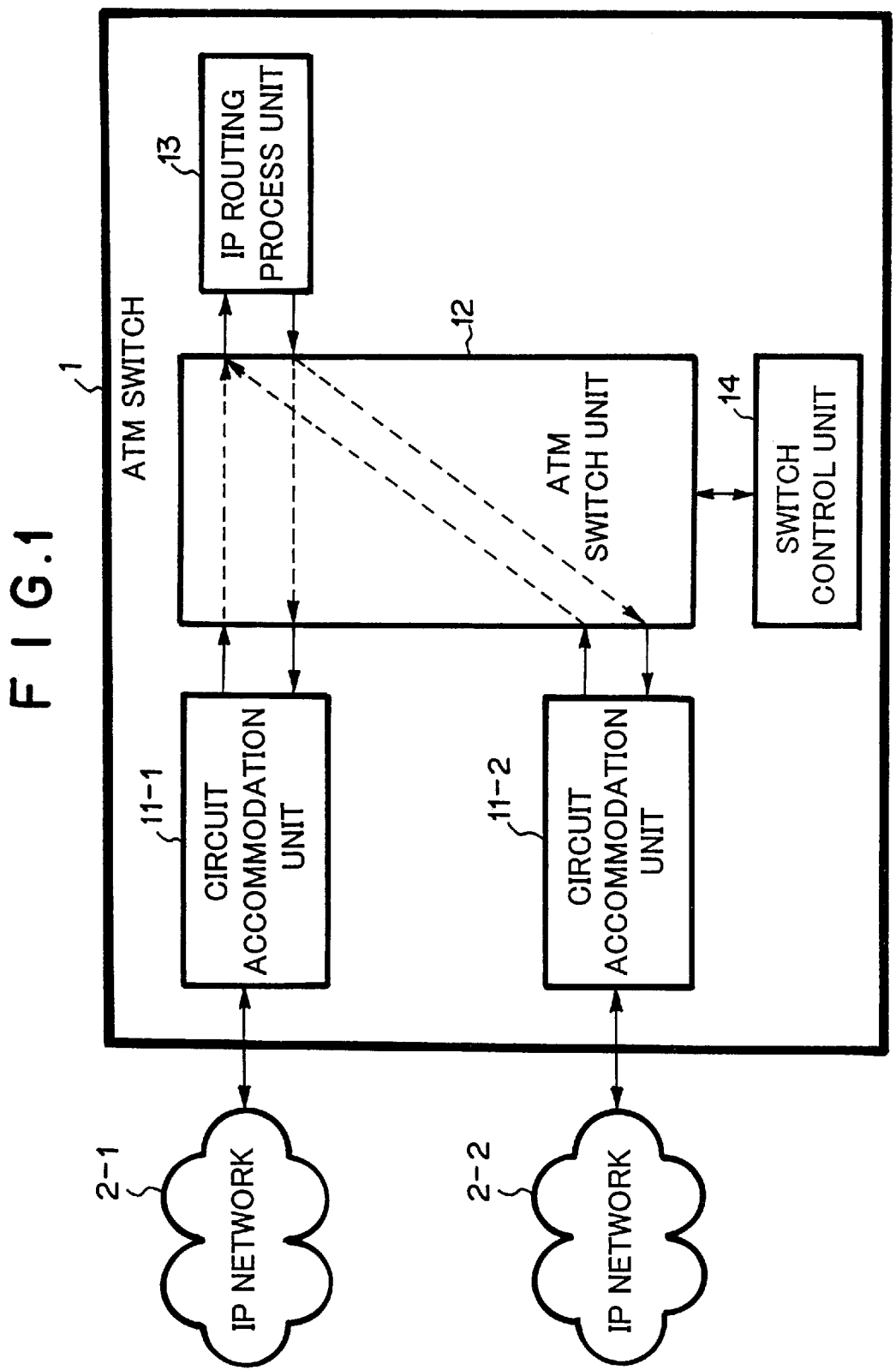
FIG. 1 is a block diagram showing a configuration of an ATM switch according to a first embodiment of the present invention.

In FIG. 1, circuit accommodation units 11-1 and 11-2 are conventional ones, and are assigned to IP network 2-1 and 2-2, respectively. ATM switch 1 further includes other circuit accommodation units which are not illustrated in FIG. 1. Circuit accommodation units 11-1 and 11-2 receive the ATM cells from IP networks 2-1 and 2-2, perform termination in a physical layer or the like, and then transmit the ATM cells to ATM switch 1. ATM switch unit 12 outputs the received ATM cells to IP routing process unit 13 in accordance with switching information predetermined by switch control unit 14. IP routing process unit 13 reads the IP header information from the received ATM cells, determines the destination VC of the ATM cells (which is the same as that of the IP packet before being segmented into the ATM cells) based on the IP header information, and transfers the ATM cells to the destination VC. The ATM cells are then transferred to ATM switch unit 12 and are sent to IP network 2-1 or 2-2 through ATM circuit accommodation unit 11-1 or 11-2, respectively.

ATM cells incoming from circuit accommodation units, not illustrated in FIG. 1, other than circuit accommodation units 11-1 and 11-2 are processed and returned thereto by ATM switch unit 12.

Thus, in this embodiment, because the IP routing function is provided by only adding IP routing process unit 13 to ATM switch 1, the ATM router of the present invention is configured by advantageously using the structure of a conventional ATM switch.

EXAMPLE

An example of the first embodiment will be explained with reference to FIG. 1.

In FIG. 1, ATM switch 1 is connected with IP network 2-1 and another IP network 2-2 through ATM circuits.

ATM switch 1 comprises circuit accommodation units 11-1 through 11-2, ATM switch unit 12, IP routing process unit 13 and switch control unit 14. IP networks 2-1 and 2-2 are connected with circuit accommodation units 11-1 and 11-2 in ATM router 1, respectively.

Circuit accommodation units 11-1 and 11-2 are connected with ATM switch unit 12, which is controlled by switch control unit 14. ATM switch unit 12 is further connected with IP routing process unit 13.

Although only two IP networks are connected in this example, three or more IP networks can readily be connected.

Figure 2:
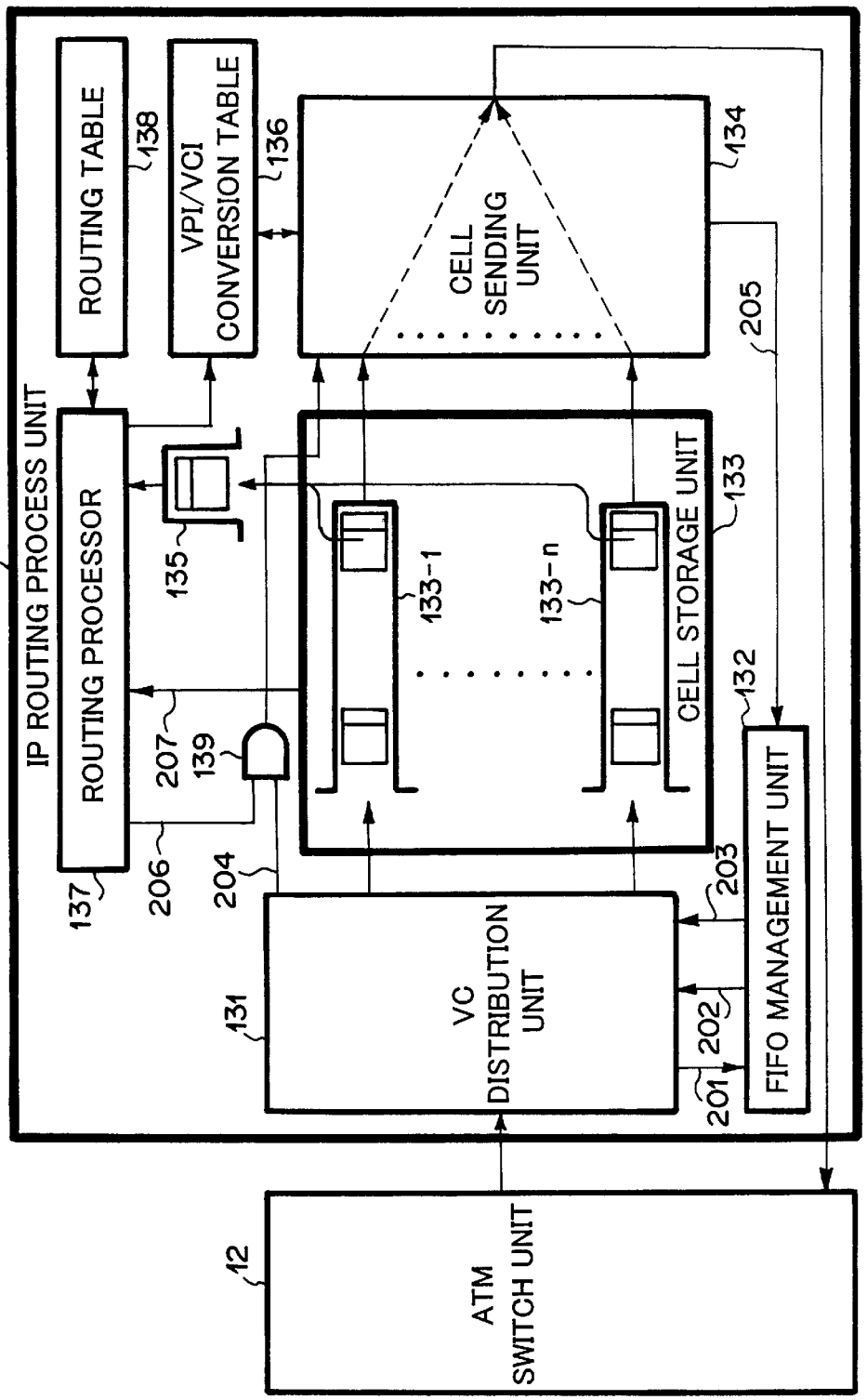
FIG. 2 is a block diagram showing a configuration of a routing process unit in FIG. 1 and a relationship between the routing process unit and an ATM switch unit.

FIG. 2 is a block diagram showing IP routing process unit 13 in detail.

VC distribution unit 131 receives the ATM cells transmitted from ATM switch unit 12 and transfers them to cell storage unit 133. Cell storage unit 133 contains FIFOs 133-1 to 133-n inside. VC distribution unit 131 identifies the VPI (Virtual Path Identifier) and the VCI (Virtual Channel Identifier) present in the header of each of the ATM cells and outputs the ATM cells having the identified VPI and VCI to the corresponding FIFO.

ATM switch 1 is not usually required to refer to all the VPIs and VCIs. Therefore, there is a case where a VPI and VCI of an ATM are substituted by a unique identifier inside ATM switch 1 (hereinafter, referred to as "connection identifier"), which corresponds to the VCI and VPI and is added to the ATM cell. However, a connection identifier may also be the VPI and VCI themselves.

Figure 3:
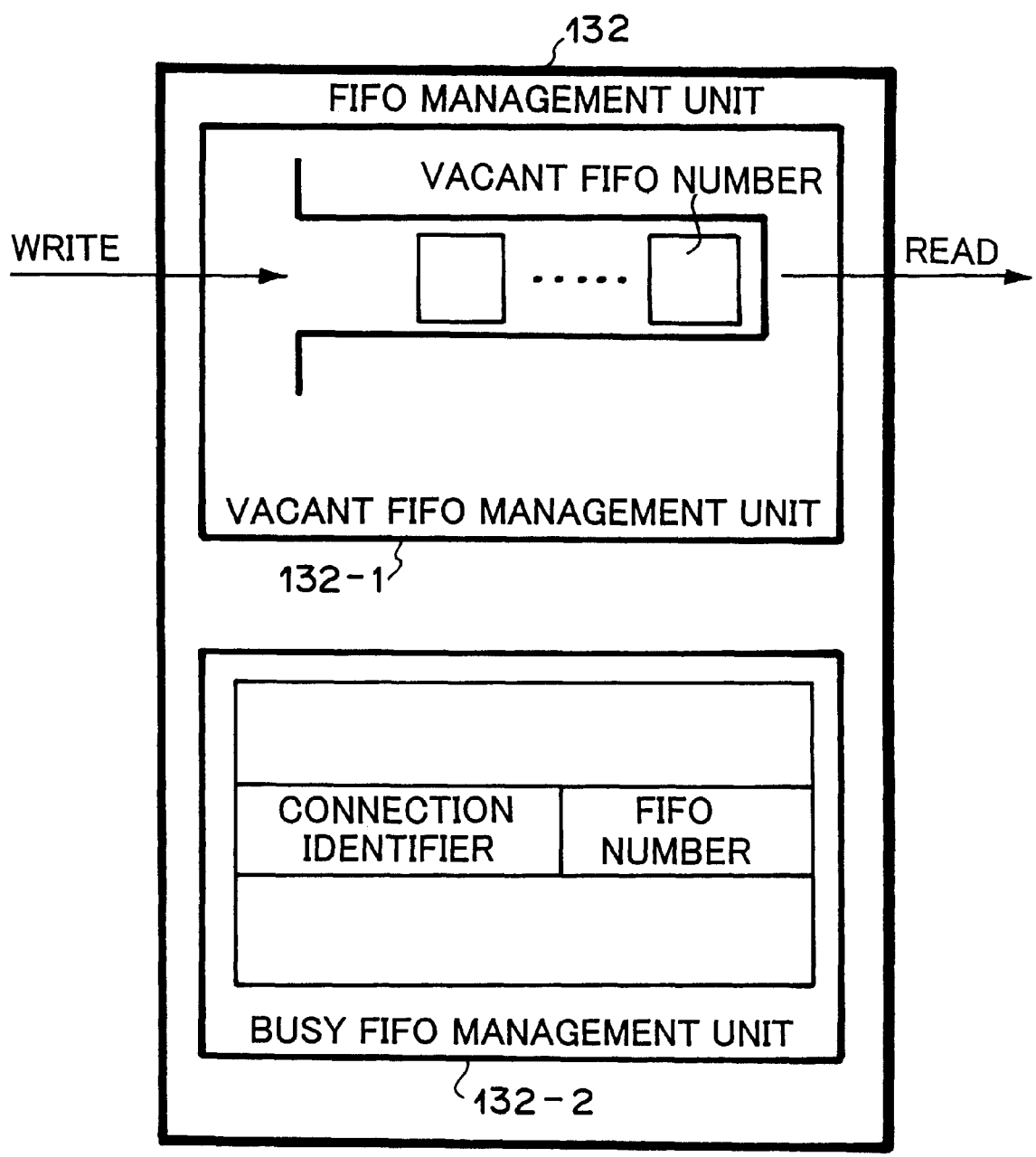
FIG. 3 is a block diagram showing a configuration of an FIFO management unit in FIG. 2.

FIFO management unit 132 has, as will be explained later, a management function for managing which FIFO is vacant among FIFOs 133-1 to 133-n in cell storage unit 133. The managing method is not detailed herein but explained briefly as follows: A queue for storing vacant-FIFOs' numbers is prepared in vacant FIFO management unit 132-1 as shown in FIG. 3. After having finished feeding all the ATM cells to cell sending unit 134 from any one of FIFOs 133-1 to 133-n within cell storage unit 133, the number of the FIFO (for example, the numbers 1, 2, 3, . . . , n given to FIFOs 133-1 to 133-n) is added to the queue. When VC distribution unit 131 requires a new FIFO for distributing an ATM cell with a new connection identifier, VC distribution unit 131 reads a FIFO number from the queue and decides the FIFO having this number as a destination FIFO for distribution.

Each of the outputs of FIFOs 133-1 to 133-n is supplied to cell sending unit 134. FIFOs 133-1 to 133-n store the ATM cells transmitted from VC distribution unit 131 and output the ATM cells always in an order in which an ATM cell stored earlier is outputted prior to an ATM cell stored later.

In this example, FIFOs 133-1 to 133-n are individual devices but, by using one or more memory devices and a controller to control writing to and reading from the memory devices, a function similar to those FIFOs may be realized.

When each of FIFOs 133-1 to 133-n inputs the first ATM cell of an IP packet, or inputs an ATM cell when it is in a vacant state, it outputs a copy of the first ATM cell to process-requesting FIFO 135. However, if the amount of the information necessary for IP routing exceeds a capacity assigned to the first ATM cell for the information, each of FIFOs 133-1 to 133-n outputs the first several cells to process-requesting FIFO 135 rather than only the first one cell.

An output of process-requesting FIFO 135 is supplied to routing processor 137 which performs an IP routing process with reference to the contents of routing table 138.

In routing table 138, a plurality of entries each having a pair of a destination IP address and a destination port are written. A destination port, to which an IP packet having a certain destination IP address is sent, is indicated by an entry. In this example, the destination port means a virtual channel which can be identified with a VPI/VCI. That is, the destination port consists of the VPI/VCI.

Routing processor 137 creates the contents of routing table 138. There are two methods for creating the contents of routing table 138 as follows:

(1) In a case where the correspondence between a destination IP address and a destination port is known from the beginning:

In this case, routing processor 137 only writes the destination IP address and the destination port in routing table 138 first. This is called static routing.

(2) In a case where the correspondence between the destination IP address and the destination port varies from time to time:

In this case, routing processor 137 updates the contents of the correspondence between the destination IP address and the destination port whenever it varies. This is called dynamic routing. In the case of dynamic routing, a change in the correspondence between the destination IP address and the destination port can be determined by a routing protocol.

Examples of the routing protocol include RIP (Routing Information Protocol), OSPF (Open Shortest Path First).

By transmitting and receiving the IP packet regarding the routing protocol with another router and the like, the routing protocol is performed.

In cell storage unit 133, not only IP packets to be sent back to ATM switch unit 12 but also IP packets to be sent to routing processor 137 are stored. The latter IP packets may be IP packets relating to the routing protocol.

Routing processor 137 reads the contents of the ATM cells stored in process-requesting FIFO 135. The header of an IP packet is contained in the first ATM cell, and accordingly, the destination IP address can be known by reading the contents of the first ATM cell. Routing processor 137 knows the destination port on the basis of the destination IP address with reference to routing table 138.

Routing processor 137 writes to VPI/VCI conversion table 136 the pair of destination ports consisting of the VPI/VCI of the currently processed ATM cell and the VPI/VCI obtained by referring to routing table 138.

Subsequently, routing processor 137 sends process-completion signal 206 to AND gate 139.

When an AND condition between storage-completion signal 204 is sent from VC distribution unit 131 and process-completion signal 206 is satisfied at AND gate 139, cell sending unit 134 begins to read the ATM cells from cell storage unit 133. Although only one AND gate 139 is illustrated in FIG. 2, AND gates as many as the number of FIFOs in cell storage unit 133 are required practically in practice.

Cell sending unit 134 converts the VPI/VCI of each of the ATM cells from cell storage unit 133 with reference to VPI/VCI conversion table 136 and sends the ATM cells of which VPI/VCIs have been converted to ATM switch unit 12.

Next, the operation of the ATM switch with IP routing process function in FIG. 1 will be explained.

ATM switch 1 receives an IP packet which has been segmented into ATM cells from IP network 2-1 at circuit accommodation unit 11-1. The received ATM cells are transferred to ATM switch unit 12.

ATM switch unit 12 outputs ATM cells which are input from circuit accommodation units 11-1 and 11-2 to IP routing process unit 13, and also outputs ATM cells which are input from IP routing process unit 13 to circuit accommodation units 11-1 and 11-2. Whether ATM switch 12 sends ATM cells from IP routing process unit 13 to circuit accommodation unit 11-1 or 11-2 is determined by information in ATM switch unit 14 which has been set by switch control unit 14. That is, in accordance with an input port of ATM switch unit 12 connected to IP routing process unit 13 and a VPI/VCI of an input ATM cell, it is determined which output port the input ATM cell is output to and accordingly, which circuit accommodation unit the input ATM cell is output to. This correspondence is set in ATM switch 12 by switch control unit 14 beforehand.

IP routing process unit 13 reads the contents of a received ATM cell and replaces the VPI and VCI given to the header of the ATM cell in accordance with the information of its contents. Namely, the ATM cell is transferred from a certain VC to another VC.

The operation of IP routing process unit 13 will be explained with reference to FIG. 2.

After receiving an ATM cell from ATM switch unit 12, VC distribution unit 131 sends connection identifier 201 given to the ATM cell to FIFO management unit 132, and subsequently outputs the ATM cell to the FIFO in cell storage unit 133 which has FIFO number 202 returned from FIFO management unit 132. FIFO number 202 is the FIFO number corresponding to connection identifier 201 or of a vacant FIFO.

Referring to FIG. 3, FIFO management unit 132 comprises vacant FIFO management unit 132-1 and busy FIFO management unit 132-2. In a queue of vacant FIFO management unit 132-1, there are written vacant-FIFOs' numbers. The vacant-FIFO means a FIFO which has been kept vacant after all the ATM cells therein was read therefrom. In busy FIFO management unit 132-2, there is a table holding correspondence between connection identifiers and FIFOs' numbers. When VC distribution unit 131 outputs connection identifier 201 of an ATM cell to FIFO management unit 132, FIFO management unit 132 outputs signal 203 indicating whether the ATM cell with connection identifier 201 is stored in cell storage unit 133, and also outputs FIFO number 202 to VC distribution unit 131. FIFO number 202 is a FIFO number corresponding to connection identifier 201 in busy FIFO management unit 132-2 if the ATM cell with connection identifier 201 is stored in cell storage unit 133, or a FIFO number read out from the head of the queue in vacant FIFO management unit 132-1 otherwise.

Therefore, if the connection identifier of the ATM cell intended to be output to cell storage unit 133 has been written in busy FIFO management unit 132-2, VC distribution unit 131 stores the ATM cell in the FIFO with the FIFO number corresponding to the connection identifier among FIFOs 133-1 to 133-n in cell storage unit 133. On the other hand, if the connection identifier of the ATM cell intended to be output to cell storage unit 133 is not written in busy FIFO management unit 132-2, VC distribution unit 131 obtains the FIFO number of the FIFO in which no ATM cell is stored, and stores the ATM cell in the FIFO (any vacant one among FIFOs 133-1 to 133-n in this example) with the FIFO number obtained from vacant FIFO management unit 132-1. In the latter case, FIFO management unit 132 stores a correspondence between connection identifier 201 and FIFO number 202 which is newly established in busy FIFO management unit 132-2.

Therefore, if one or more ATM cells which have the same connection identifier as that of the ATM cell intended to be output to storage unit 133 have been already stored in any one FIFO among FIFOs 133-1 to 133-n in cell storage unit 133, the intended ATM cell is sent to the FIFO. Seen from another viewpoint, all the ATM cells which are provided with identical connection identifiers are stored in identical FIFOs among FIFOs 133-1 to 133-n.

It is noted that, in segmenting an IP packet into ATM cells, it is customary that an identifier for identifying the last cell is provided to the ATM cell which stores the tail of the IP packet.

VC distribution unit 131 sends read-requesting signal 204 to AND gate 139 at the time of reception of the last cell. When the AND condition aforementioned is satisfied, cell sending unit 134 reads out the ATM cells in the FIFO which is requested to be read, and outputs the ATM cells to ATM switch unit 12. Subsequently, cell sending unit 134 outputs FIFO-release signal 205 to FIFO management unit 132. When FIFO management unit 132 receives the FIFO-release signal, the correspondence between the FIFO number of the read out FIFO and the corresponding connection identifier is deleted from busy FIFO 132-2 and the FIFO number of the read out FIFO is added to the queue in vacant FIFO management unit 132-1.

Next, the operation of cell storage unit 133 will be explained.

When each of FIFOs 133-1 to 133-n inputs a new ATM cell in a vacant condition, it outputs a cell-storage-start-notification signal to routing processor 137 and writes the ATM cell to process-requesting FIFO 135 at the same time. However, if the header information necessary for routing an IP packet extends over two or more ATM cells, at the time of reception of all the cells which include the necessary header information, it sends cell-storage-start-notification signal 137. Further, if routing processor 137 always monitors the cell storing state of process-requesting FIFO 135, the process of routing processor 137 can be started at the time of detection of a start of cell accumulation, and accordingly, a cell-storage-start-notification signal is not required.

A Second Embodiment

Figure 4:
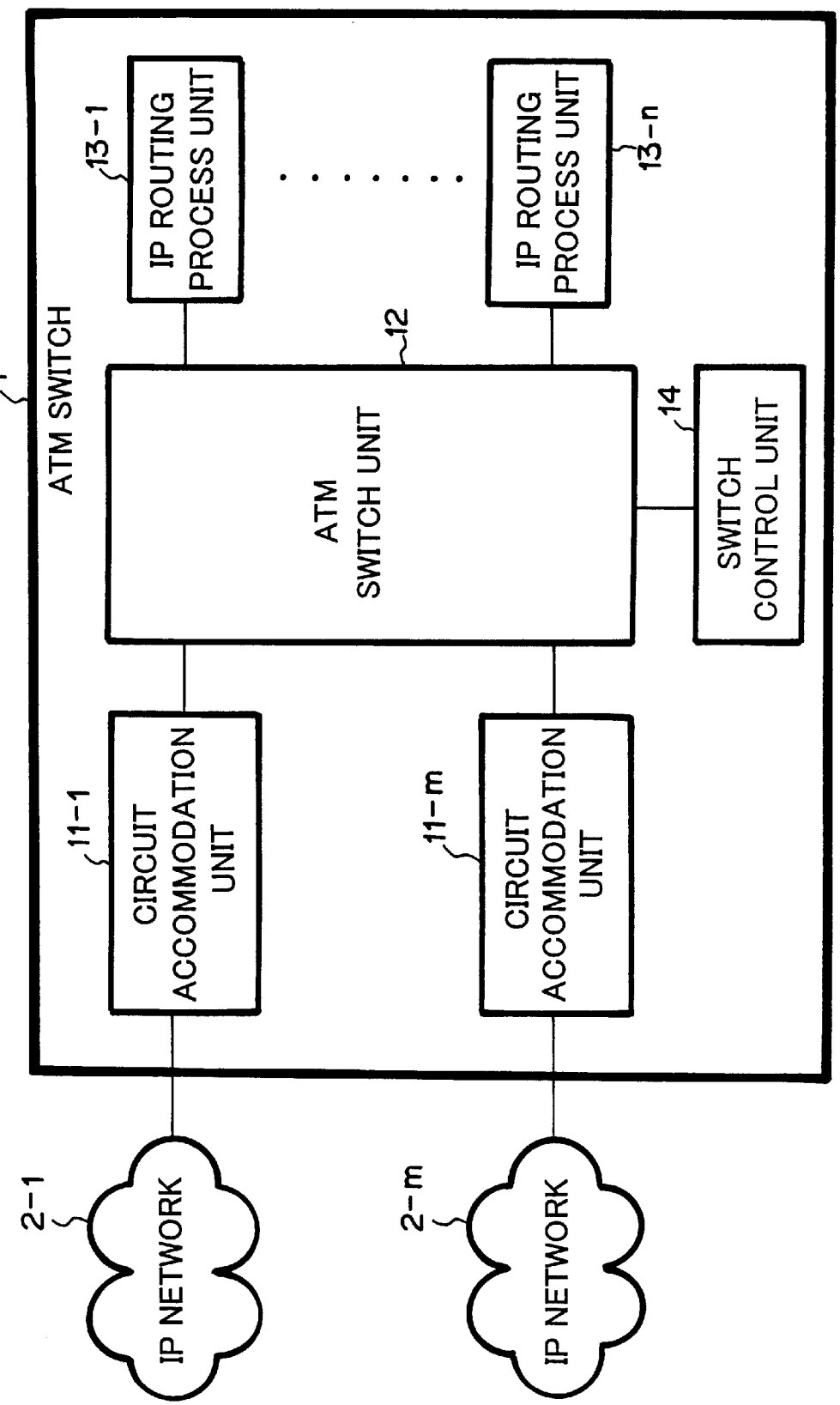
FIG. 4 is a block diagram showing a configuration of an ATM switch according to a second embodiment of the present invention.

A configuration of an ATM switch according to the second embodiment is shown in FIG. 4.

While ATM switch 1 according to the first embodiment shown in FIG. 1 includes one IP routing process unit 13, ATM switch 3 according to the second embodiment shown in FIG. 4 includes a plurality of IP routing process units 13-1 to 13-n.

In accordance with a setting in switch control unit 14, ATM switch unit 12 transfers an ATM cell, which is received at circuit accommodation units 11-1 to 11-m from IP networks 2-1 to 2-m, to any one of IP routing process units 13-1 to 13-n. While only one routing process unit 13 performs the routing process according to the first embodiment, the plurality of IP routing process units 13-1 to 13-n can perform the routing processes according to this embodiment.

Each of circuit accommodation units 11-1 to 11-m is variably connected with any one of IP routing process units 13-1 to 13-n in accordance with the setting by switch control unit 14. For example, circuit accommodation units 11-1 to 11-m may be connected to IP routing process units 13-1 to 13-n in one-to-one correspondence or in a relationship set in accordance with a range of VPIs and VCIs.

Thus, according to this embodiment, throughput of an IP routing process of the ATM switch is improved by including a plurality of IP routing process units.

A Third Embodiment

Figure 5:
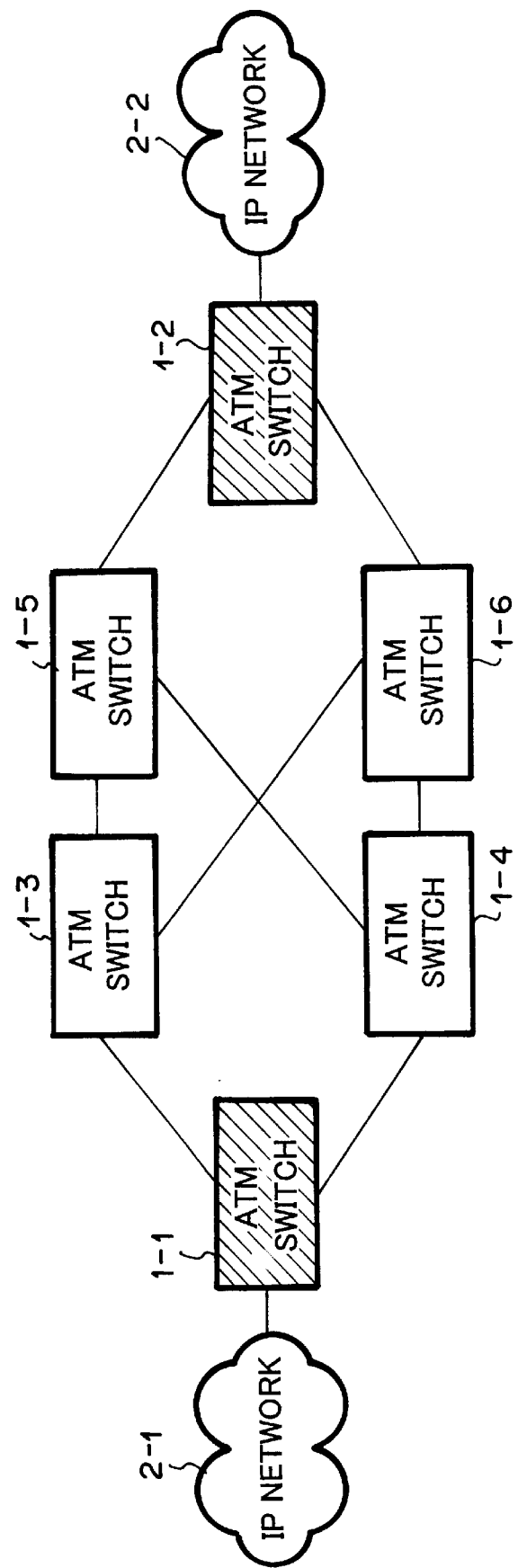
FIG. 5 is a block diagram showing a connection relationship between the ATM switches of the present invention and conventional ATM switches, according to a third embodiment of the present invention.

A connection topology among ATM switches according to the third embodiment is shown in FIG. 5.

While IP networks are connected with a single ATM switch according to the first embodiment, they are connected with a plurality of ATM switches according to this embodiment. In FIG. 5, ATM switches 1-1 and 1-2 are the ATM switches according to the first or second embodiment which include the IP routing process unit. Accordingly, other ATM switches 1-3, 1-4, 1-5 and 1-6 are not required to include the IP routing process unit. In comparison with this embodiment, according to the conventional ATM network, because ATM switches having the routing function are not arranged at the locations of ATM switches 1-1 and 1-2, it is necessary to connect ATM routers to the network.

As explained above, according to the present invention, the following effects are achieved.

A first effect is as follows: Addition of IP routing process unit 13 in FIG. 1 to a conventional ATM switch results in the addition of the IP routing function to the conventional ATM switch, and accordingly the ATM router can be configured by advantageously using a structure of the conventional ATM switch.

A second effect is as follows: the header information of an IP packet is read directly from ATM cells without reassembling the IP packet from the ATM cells to perform the routing process. Accordingly, it is not required to read the IP packet from a reception memory and write the IP packet to a transmission memory by using, for example, an LSI for SAR (Segmentation And Reassembly) process. Thus, the load caused by the process can be reduced, and a higher speed IP packet process as compared to the prior art can be achieved.

A third effect is as follows: VCs which require the IP packet processing and VCs which do not require the IP packet processing can be treated together in one ATM switch, and accordingly, the structure of such prior art ATM switch can effectively used.

Having explained the preferred embodiments of the present invention, it will now become apparent to those of ordinary skill in the art that other embodiments incorporated these concepts may be used. Accordingly, it is submitted that the invention should not be limited to the explained embodiments but rather should be limited only by the spirit and scope of the appended claims.

What is claimed is:

1. An ATM switch comprising:

an ATM switch unit;

a switch control unit for controlling said ATM switch unit;

one or more circuit accommodation units for receiving IP packets which have been segmented into ATM cells from one or more external ATM networks, respectively, and for transferring said ATM cells to said switch unit; and an IP routing process unit for routing IP packets as segmented into their component ATM cells, without requiring reassembly of the segmented IP packets from their respective component ATM cells;

wherein said IP routing process unit comprises:

a cell storage unit having a plurality of memories, each of said plurality of memories having a capacity for storing a plurality of ATM cells;

a distributing means for distributing said ATM cells received from said ATM switch unit to said plurality of memories while grouping said ATM cells in each of said plurality of memories in accordance with an IP packet to which each of said ATM cells belongs;

a sending means for sending all the ATM cells belonging to an identical IP packet when said all the ATM cells belonging to said identical IP packet have been stored in a respective one of said plurality of memories; and a means for converting a VPI/VCI (Virtual Path Identifier/Virtual Channel Identifier) of each of said all the ATM cells belonging to said identical IP packet.

2. The ATM switch according to claim 1, wherein each of said plurality of memories comprises a FIFO.

3. The ATM switch according to claim 1, wherein said distributing means comprises:

a means for storing connection identifiers each corresponding to a VPI/VCI before conversion and storing identification numbers each corresponding to each of non-vacant memories among said plurality of memories while holding correspondence between each of said connection identifiers and each of said identification numbers; and a queue for queueing identification numbers of vacant memories among said plurality of memories.

4. The ATM switch according to claim 1, wherein said sending means detects whether or not said all the ATM cells in said identical IP packet have been stored in respective one of said plurality of memories by use of an identifier for identifying the last ATM cell among said all the ATM cells in said identical IP packet.

5. The ATM switch according to claim 1, wherein the converted VPI/VCI corresponds to an IP address of said IP packet to which said ATM cell belongs.

6. The ATM switch according to claim 5, wherein said IP routing process unit further comprises a routing table for holding a correspondence between said converted VPI/VCI and said IP address.

7. The ATM switch according to claim 6, wherein said IP routing process unit further comprises a means for updating contents of said routing table in response to generation of a routing protocol.

8. The ATM switch according to claim 1, wherein said ATM switch comprises a plurality of said IP routing process units.

* * * * *